United States Patent Office 3,047,543
Patented July 31, 1962

3,047,543
SULPHUR-CONTAINING HEAT-RESISTANT RESINS
Avery A. Morton, Watertown, Mass., and John B. Littlefield, Monsey, and William D. Mecum, Sloatsburg, N.Y., assignors to American Brake Shoe Company, New York, N.Y., a corporation of Delaware
No Drawing. Filed Feb. 25, 1958, Ser. No. 717,307
6 Claims. (Cl. 260—79)

This invention relates to heat resistant resins and more particularly to heat resistant resins adapted for use as bonding agents. This application is a continuation-in-part of application Serial No. 436,235, filed June 11, 1954.

There are many instances where it is desirable that laminations or compositions be bonded with an adhesive which possesses the property of withstanding high temperatures. An example of such binder would be a thermosetting resin of the phenolic-aldehyde type possessing a high degree of heat resistance by reason of the non-linear or cross linked nature of this type of resin in its final stage of cure and growth as distinguished from the linear or thermoplastic type of resin. Irrespective of its thermosetting nature, however, it is known that at temperatures of around 700° F. the phenolic-aldehyde type of resin binder undergoes thermal decomposition as evidenced, for instance, by the observed formation of decomposition products on the surface of molded compositions, such as composition friction elements in the form of brake linings and the like, employing this particular kind of resin as a binder. Nevertheless, from the standpoint of resistance to thermal break-down, the phenolic-aldehyde type resin has heretofore proven to be the most satisfactory in most industrial applications requiring heat resistant binders.

In view of the tendency of phenolic-aldehyde type resins to undergo thermal break-down at temperatures which often prevail under certain circumstances, the primary object of the present invention is to provide a resin binder that displays improved thermal stability at temperatures of 700° F. or above for prolonged periods.

A further object of the present invention is to make available a heat resistant resin useful as a binder and one which exhibits resistance to thermal break-down to a greater degree than has heretofore been possible with the phenolic-aldehyde type resin.

A further object of the present invention is to provide a highly heat resistant and thermally stable resin which is the condensation reaction product of a mixture of methyl-substituted aryl amine monomers and sulfur.

Other and further objects of the present invention will be apparent from the following description and claims which by way of illustration show preferred embodiments of the present invention and the principle thereof and what we now consider to be the best mode in which we have contemplated applying that principle. Other embodiments of the invention embodying the same or equivalent principles may be used and structural changes may be resorted to as desired by those skilled in the art without departing from the present invention and the purview of the appended claims.

Under and in accordance with the present invention, we have discovered that if ring or cyclic nuclei are condensed with the trivalent thiazole radical

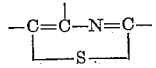

in the manner to be described more particularly hereinafter, there results a resin which possesses heat resistance and thermal stability in excess of those characteristics as possessed by the phenolic-aldehyde type of resin. The resin of the present invention is, therefore, rightly designated as being thermosetting in nature, but as will be pointed out hereinafter the structure of the resin is linear, or branched at best, and not at all cross-linked in its usable form so that it is also somewhat in the nature of a thermoplastic resin.

Where the two adjacent carbons in the thiazole radical diagrammed above are actually adjacent carbons included in a ring compound serving as a monomer reactant for the polymeric system eventually formed, the linkage between this monomer reactant and the next adjacent one in the polymeric system can rather be viewed as consisting of the trivalent radical

with the single carbon atom in this latter radical being attached to the said adjacent monomer reactant in the polymeric system. The polymeric system characteristic of the resin itself is best attained by reacting with sulfur those cyclic monomers which each contain a reactive amino nitrogen grouping attached at one position on the ring and a reactive methyl carbon grouping attached at another position. However, we have found that the use of a mixture of monomers is essential to the attainment of a proper reaction and result rather than the use of a hundred percent pure monomer. A carbon atom having three potentially reactive valence bonds, such as afforded by a methyl group attached to the ring compound, is necessary for satisfying the three valence bonds presented by nitrogen and sulfur as a unit in the

sub-radical as can be readily seen by inspection, and the other two unsatisfied valence bonds of nitrogen and sulfur in this thiazolic sub-radical can then attach themselves to open monovalent positions, as for instance, at the hydrogen positions, on adjacent carbons present in the other of the two aromatic ring compounds. Thus, one position adjacent to nitrogen in the nitrogen-containing monomer (usually in the form of an amine as will be shown hereinafter) must be accessible to and available for one of the valence bonds of sulfur.

From the foregoing, it will be appreciated that methyl-substituted aryl amino compounds represent the cheapest and most available source of monomer reactants, and within this class are the three isomeric forms of toluidine, all readily available in mixed form and hence the preferred source of mixed monomers. In addition to the need for a mixture of different monomers rather than pure monomers, we have further found that primarily it is the thiazolic type of radical link between adjacent nuclei in the system which imparts to the resin product of the present invention the desirable properties mentioned, and, therefore, the examples to follow achieve this result by the most expeditious means available and are illustrative, not limiting, especially since the equivalents of the reactants used and the variations in proportions can be predicted by one skilled in the art from the foregoing and the description to follow.

For purposes of disclosure, both the structure of the resin and its preparation will in most instances be illustrated by reaction between mixed toluidine isomers and sulfur, because these amines are at the present time the most convenient source of mixed monomers available for the preparation of the thiazole resin. Below is illustrated a simplified structural version of one form of the resin, but it should be noted that the bond from carbon (methyl carbon) may be at different positions on the ring, depending upon which isomer of toluidine each particular nucleus in the system happens to be:

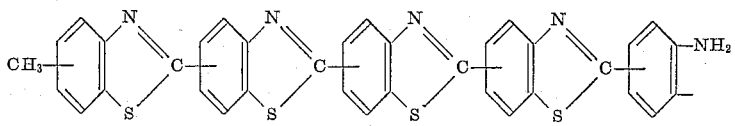

Five recurring units only are depicted here for purposes of disclosure, since the exact number will vary widely with the quality of materials used, the different reaction rates of the different monomers, and the extent of reaction.

From a balanced formula standpoint, four atoms of sulfur are required for each toluidine monomer for jointly forming the thiazole group and eliminating at the same time the six hydrogen atoms. These six hydrogen atoms are collectively the amino hydrogens, the methyl hydrogens and the hydrogen atom adjacent to the amino nitrogen on the ring nucleus. Hence, the reaction to this extent can be formulated generally as follows, the reaction proceeding best at a temperature of about 200° C. or above:

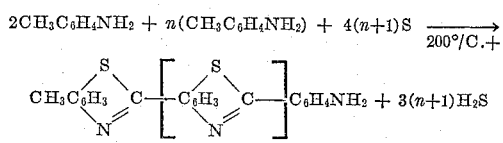

The union of the mixed toluidine monomers through the medium of sulfur to form a polymeric system is accompanied by the release of six equivalents of hydrogen for each atom of sulfur introduced during the reaction as can be seen from the above formula. Three moles of hydrogen sulfide are thus released during the process, and this gaseous reaction tends to render the resin product somewhat porous, especially when cool. If it is desired to eliminate the porous nature of the resin, this can be readily accomplished simply by allowing the resin mass to cool to a brittle state after an intermediate stage of formation has been reached and then subjecting the same to heat and pressure to cause plastic re-flow. However, at room temperature, the resin mass is brittle, and the porous nature of the reaction product greatly facilitates mechanical reduction of the mass to powder or granular form in which condition it may easily be handled and utilized as a binder material.

As noted above, a mixture of monomers is essential to the formation of a product which possesses the characteristic resinous properties of tack and the ability to be drawn out in filament form from a hot melt. Use of a pure monomer does not result in a product having such properties as will be shown hereinafter.

A branched type of resin can be easily obtained by introducing methyl-substituted amino monomers with polyfunctional groups causing resin growth to occur in at least two directions. In a mixed toluidine system, such branching or two directional growth can be obtained most readily by introducing some xylidine.

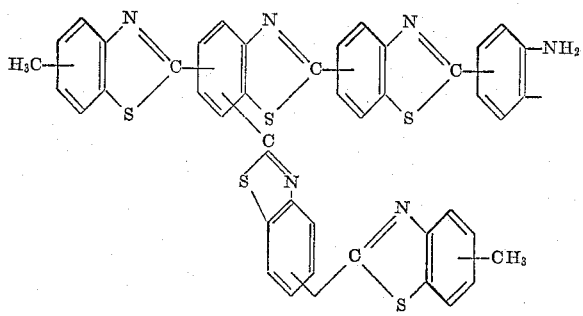

In a similar fashion, an aromatic ring monomer having two amino groups and one methyl group may be resorted to where branching is desired. Aniline may be added to the system in order to terminate growth of the resin or to balance the number of methyl groups if an excess is present because of xylidine addition. Also mixed pyridines and other methyl-substituted amino ring compounds that are equivalent to the mixed toluidines can be used to produce the resin of the present invention.

The thiazole resins may be produced in an intermediate stage of formation in such a way by suitable heat cycles as to have melting points from about 100° C. or less to 250° C. or higher. In general, we prefer to carry this initial reaction to a melting point of about 180° C. At this intermediate stage of resin formation, the resin mass when cool is brittle and porous as noted above and may easily be ground to finely divided or granular form. From this stage, the resin may be further processed in a subsequent heat cycle and heat-advanced thereby to the theoretical final thiazole system with a cure loss of from about ten percent to fifteen percent depending on the exact composition used. When thus cured to the approximate theoretical structure obtainable from the mixture of monomers used, the resin in its final stage of growth displays remarkable resistance to heat as evidenced by the observation that it may be heated to 600° C. in about thirty minutes with a weight loss which does not exceed about 5.0 percent. In comparable tests, as will be shown, the best cured heat resistant phenolics will show heat losses of about thirty to thirty-five percent under these conditions.

The following are examples of preparing the thiazole resin of the present invention and in each instance the resins thus prepared possessed heat resistance well beyond the known range for phenolic-aldehyde resins.

EXAMPLE 1

Mixed toluidines, 214 grams, and sulfur, 256 grams, were charged into a 3-neck flask equipped with a constant speed agitator, a thermometer well and an air-cooled condenser connecting the flask to a water-cooled condenser. Heat was applied to the reaction mixture at such a rate that a temperature of 200° C. was reached in about 25 minutes. Hydrogen sulfide began coming off at about this temperature and increased rapidly as the temperature was increased above 200° C.

Clogging of the condensers by monomers entrained in the gas stream was prevented by adding a few drops of benzene, as necessary, to the reaction mixture. After 185 minutes of heating at from 200° C. to 261° C. the mass became very viscous and had lost 167 grams of $H_2S$ (about 82 percent theoretical). After cooling, the brown porous mass weighed 302 grams. This product was quite resinous in nature, possessing a tack point of about 170° C., and a small sample placed on a hot plate at 230° C. to 250° C. could be drawn out to at least a 30-inch brittle fiber when cold. This example serves to demonstrate the resinous properties which can be achieved in the thiazole system by the use of mixed toluidine isomers.

EXAMPLE 2

Mixed toluidines, 171.2 grams, mixed xylidines, 48.4 grams, and sulfur, 265 grams, were processed in essentially the same manner as Example 1. After 165 minutes of heating between 200° C. and 260° C., the product had lost 166 grams of $H_2S$ and had become very thick and viscous. On cooling, a yield of 303 grams of brownish black porous resin was obtained. This product displayed resinous properties similar to the product of Example 1 and had good heat resistance despite the fact that it contained an excess of about 20 percent of methyl groups over available amino groups. The xylidine used in this example permitted branching of the molecular structure. Example 2 and Examples 3, 4 and 5 which follow illustrate that satisfactory resinous properties can be achieved in the thiazole system by using various mixtures of different isomers as represented either by benzene or mixed benzene-pyridine groupings.

EXAMPLE 3

Mixed toluidines, 171.2 grams, mixed xylidines 24.2 grams, aniline, 18.6 grams, and sulfur, 256 grams, were heated together in the same manner as in Example 1. In this example, the amount of aniline used is theoretically sufficient to form thiazole linkages with the extra methyl group on the xylidine. After heating for 186 minutes at from 200° to 260° C., the product became very viscous and 174 grams of $H_2S$ were eliminated from the reaction mixture. On cooling, a yield of 296 grams of brownish black, friable resin was obtained. This reaction was calculated to be about 85 percent complete, and the product displayed resinous properties and heat resistance similar to the foregoing examples.

EXAMPLE 4

Mixed toluidines, 171.2 grams, mixed xylidines, 24.2 grams, phenylene diamine, 18.4 grams, and sulfur, 256 grams were heated together in the same manner as in Example 1. The amount of phenylene diamine used is theoretically sufficient to form cross linking thiazole structures between the extra methyl groups on the xylidine. After heating for 142 minutes at from 200° C. to 260° C., the product became very viscous and 166 grams of $H_2S$ had been eliminated from the reaction mixture. On cooling, a yield of 304 grams of brownish black friable resin as in the foregoing examples was obtained. This reaction product was calculated to be about 82 percent complete and displayed resinous properties of the order of those described in Example 1.

EXAMPLE 5

Mixed tolidines, 171.2 grams, and 43.2 grams of a mixture of equal parts of 4-methyl, 5-methyl and 6-methyl, 2-aminopyridines were heated as in Example 1 with 256 grams of sulfur. After heating for 140 minutes at a temperature of from 200° C. to 260° C., the product became very viscous and then was allowed to cool. During the heating, 165 grams of $H_2S$ were eliminated from the reaction mixture, and the reaction itself was calculated to be about 81 percent complete. A yield of 305 grams of nearly black, friable resin was obtained, and this product had resin characteristics similar to the foregoing examples.

EXAMPLE 6

Mixed toluidines, 1125 grams, and sulfur, 1275 grams, were heated for about four hours between about 205° C. and 255° C. During this heating, $H_2S$ was eliminated from the system and the reaction mixture gradually increased in body in the reaction chamber. Heating was discontinued after about 865 grams of $H_2S$ had been expelled and the reaction mixture had become too viscous to stir properly, the latter condition generally being indicative of the completion of this stage of reaction. On cooling, 1535 grams of a dark brown friable resin was obtained. This product had a melting point of about 185° C. and displayed characteristic resinous properties as in the foregoing examples. Calculated on the basis of $H_2S$ expelled during heating, the reaction was about 85 percent complete.

Example 6 serves to demonstrate that useful thiazole resins can be prepared in accordance with the present invention by using somewhat less than four moles of sulfur per mole of toluidine or equivalent monomer reactant. The 3.8 mole ratio used in Example 6 produces a resin having properties substantially equal to Example 1 in which there were used 4.0 moles of sulfur (theoretical) per mole of toluidine. However, it should be noted that we have also determined that when the sulfur is reduced appreciably below the 3.8 mole level per amino group there is a corresponding decrease in heat resistance, and at 3.2 mole sulfur level heat resistance is seriously affected. Aspects of this will be discussed below.

EXAMPLE 7

The mixed toluidines used in Examples 1 to 6 were those commercially available and had the following stated analysis: ortho, 60.0%, meta, 3.0%, para, 37.0%.

In Example 7 there was used a 50–50 mixture of relatively pure ortho and para isomers. In order to avoid rapid depletion of the more reactive para isomer in the 50–50 mixture a method was resorted to for adding half of the para and a quater of the sulfur in ten even increments throughout the major portion of the reaction time.

Thus the first mixture comprised of 214 grams (2.0 gram moles) of ortho toluidine; 107 grams (1.0 gram mole) of para toluidine and 384 grams (12 gram moles) of sulfur were charged into the reactor. A second mixture was prepared by blending 107 grams (1.0 gram mole) of para toluidine with 128 grams (4.0 gram moles) of sulfur. About ten percent of this second mixture was added to the first mixture in the reactor every twenty minutes after the temperature reached about 205° C. At the termination of the first five additions the temperature was 221° C. and only 116.0 grams of $H_2S$ had been eliminated from the reaction. The reaction was held without further addition until 139 grams of $H_2S$ were lost and the temperature was 227° C. Then, 23.5 additional grams of the second mixture were added following each subsequent release of about 28 grams of $H_2S$. After 284 grams of $H_2S$ were lost, the last of the second mixture was added to the reactor at a temperature of 259° C. The reaction mixture was held for 25 minutes at 260° C. until it became too viscous to stir and 327 grams of $H_2S$ had been expelled. A yield of 610 grams of a dark brown, friable resin was obtained which had a melting point of about 185° C. and in appearance was similar to Example 1. The reaction was calculated to be about 80.0 percent complete at the stage of removal from the reactor.

EXAMPLE 8

This example is to demonstrate the production of thiazole resins in acordance with the present invention by using a mixture of monomers obtained by mixing toluidines and a single commercially pure isomer of methyl 2-aminopyridine, namely, 4-methyl 2-aminopyridine. This mixture containing equal molar parts of (1) mixed toluidines (ortho, meta and para) and (2) the 4-methyl 2-aminopyridine was prepared simply by replacing a half molar part of the toluidines of Example 1 and substituting the same by an equivalent molar quantity of 4-methyl 2-aminopyridine. The equal molar mixture thus prepared is processed identical to Example 1 to produce a product having good heat resistance and resinous properties substantially the same as the product of Example 1.

EXAMPLE 9

This example demonstrates the production of a thiazole resin by the addition of the sulfur in increments. This necessitates a much longer reaction time since temperatures cannot be conveniently raised as rapidly unless resort is had to pressure. In this example, mixed toluidines, 1100.0 grams, are heated with 660.0 grams of sulfur for about 7.0 hours at 360° F. to 385° F. At this point the product is pale yellow, nearly clear and relatively non-tacky. Additional sulfur, 330 grams, is added and heating is continued for about 8.0 hours at from about 385° to about 410° F. At this point the product is quite clear and resinous. The last increment of sulfur, 330 gms., is added and heated for about 12.0 hours at from 412° F. to 472° F. At this point about 840 grams of H₂S has been expelled from the system and the thick viscous mass is poured into a pan. The resulting yield (about 1583 grams of dark brown, friable resin) has a melting point of about 330° F. In all respects it has the appearance the same as the product of Example 1 and good heat resistance and resinous properties similar to those of the product of Example 1.

Resin products of the above examples can be heat advanced to a subsequent state of formation where they are no longer observed to be tacky under mild pressure at 1000° F. This stage of virtually complete resin growth and formation can be brought about by heating reaction products such as those of Examples 1 to 7 from 180° C. to 360° C. in about 90 minutes, or by having resort to other equivalent heat cycles above about 250° C. During this heat advancement, the resin loss is about nine percent of weight, mostly hydrogen sulfide which manifests further resin formation.

The following table correlates the data pertinent to some of the foregoing examples and contrasts similar data corresponding to a typical phenolic-aldehyde resin of commerce.

temperature being allowed to increase from 200° C. to 252° C. in about 140 minutes. At this point, the reaction product was found to be too viscous to stir, and on cooling about 331 grams of a dark porous, cindery mass were obtained. This product also displayed poor resinous properties, as the inability to be drawn out into a long filament when heated to its melting point, and further illustrates that pure methyl-substituted aromatic amine monomers when heated with sulfur will not result in a binder product having resinous properties and those of the present invention.

In the above Examples 1 to 6, the mixed toluidines referred to were of commercial form and contained 60 percent of the ortho isomer, 37 percent of the para and 3 percent of the meta isomer. The xylidines used in a similar way contained 60 percent ortho and the rest, 40 percent, a mixture of para and meta. However, as can be determined from Example 7 these percentages are not critical, and the particular mixture employed remains substantially a matter of choice and judgment based on known physical constants, mass action rates and temperature reaction differentials of the monomers used. Thus, a lesser amount of a more reactive methyl-substituted aryl amino monomer could be substituted for a greater amount

*Table I*

| I | II | III | IV | | | V | VI |
|---|---|---|---|---|---|---|---|
| | | | Product of Column III Heated from 260° C.-600° in 32 mins. | | | | |
| Example | Percent Advance In Flask | Percent Loss on Heating to 360° C. | Percent gases | Percent Condensable Liquids | Percent Residue | Length of Filament Drawn Out, Inches | Nature of Resin Product in Column II |
| 1 | 82.0 | 9.5 | 0.25 | 4.75 | 95.00 | 30.0 | Sticky. |
| 2 | 81.4 | 8.8 | 0.40 | 4.60 | 95.00 | 30.0 | Do. |
| 3 | 85.3 | 8.5 | 0.00 | 4.25 | 95.75 | 30.0 | Do. |
| 4 | 81.4 | 9.2 | 1.00 | 5.00 | 94.00 | 30.0 | Do. |
| 5 | 81.0 | 8.7 | 1.62 | 5.25 | 93.13 | 30.0 | Do. |
| 6 | 84.8 | 9.3 | 0.00 | 4.35 | 95.65 | 30.0 | Do. |
| 7 | 80.0 | 10.3 | 0.68 | 4.48 | 94.84 | 30.0 | Do. |
| Cured Conventional Phenolic-Aldehyde Resin Binder | | | 7.15 | 25.30 | 67.55 | | |

It is to be noted that the calculated percent losses to complete the thiazole structure theoretically obtainable by heating the products corresponding to the second column of Table I would vary from about 12.8 percent for Example 5 down to about 10.1 percent for Example 3.

The use of a pure monomer such as a pure toluidine isomer will not result in a product that possesses any definite tack or which when melted can be drawn out into a brittle self-sustaining filament of substantial length, both of which are characteristic attributes of true resins. Thus, the pure isomer, para toluidine (214 grams), and the pure isomer, ortho toluidine (214 grams), were separately processed with 256 grams of sulfur in essentially the same manner as Example 1 above. The para isomer of toluidine was heated between 200° C. and 261° C. for 124 minutes, and the ortho isomer was heated between 200° C. and 270° C. for 205 minutes, about 320 grams of a thick buttery mass resulting in each instance from reactions calculated to have been about 70 to 75 percent complete. These products, when cooled, were, respectively, yellow-orange and dark in color and were of a porous and cindery nature, but when heated above 105° C. were found to be greasy or buttery in nature, incapable of being drawn out into a brittle filament and otherwise non-resinous in nature. In neither instance was there obtained a product capable of serving as a binder in contrast to the products of Examples 1 to 7.

In a similar manner, 216 grams of pure 2-amino, 5-methyl pyridine were reacted with 256 grams of sulfur, the of a less reactive type of such monomer. In general, we do not believe it desirable to use less than 10 percent of one component in a binary mixture, and preferably from about 25 to about 50 percent.

It will be noted that in Examples 1 through 7 that we have disclosed the preparation of novel resins containing the thiazole system and prepared from aryl-type monomers containing a nucleus to which is attached at least one methyl ($-CH_3$) and at least one amino ($-NH_2$) group. Elimination of the hydrogen in these two essential groups makes available, respectively, three valence bonds on the methyl carbon for reaction and two valence bonds on the amino nitrogen for reaction, and in the presence of sulfur and heat the valences are satisfied by the creation of thiazole linkages between monomers. The position in the ring adjacent to nitrogen must be available to the introduction of sulfur into the molecule.

Furthermore, we have established that the resins of the present invention possess remarkable heat resistance when compared with phenolic resins known to have excellent heat resistance. On the other hand, if pure isomers are resorted to the products obtained do not display resinous properties and are virtually useless as bonding agents.

In order to illustrate how the outstanding heat resistance of the thiazole resins is applicable to known compositions containing fibers and fillers the following additional examples are given.

EXAMPLE A-1

Asbestos, 465 parts; barytes 755 parts; and the resin from Example 6 above, 280 parts, were processed in the following manner:

All components were intimately blended and passed through a small hammer mill with no screen. After thorough blending 200 grams of the mix were introduced into a 2.5″ x 5.0″ mold and pressed at a total pressure of 40,000 lbs. for two hours at 500° F. The mold was vented every five minutes to degas the molding. After cooling to 300° F. in the press, the sample molding was removed, and final curing was accomplished in an oven between clamps on the following heat treatment cycle:

2 hours at 220 F. to 300 F.
1 hour each at 300, 350, 400, 450, 500 and 600° F.
6 hours at 700° F.

EXAMPLE B-1

This example was prepared in exactly the same manner as Example A-1 except as hereunder noted:

A straight phenolic-aldehyde resin of conventional type having high heat resistance for this type of resin was substituted for the thiazole resin on an equal weight basis. The mixture using the phenolic resin as a binder was press-cured for one hour at 345 F., as is conventional practice, and the product was then oven-cured in the following conventional manner:

3 hours at 300° F.
3 hours at 350° F.
3 hours at 400° F.
3 hours at 450° F.

EXAMPLE C-1

This example was prepared in exactly the same manner as Example A-1 except as hereunder noted:

An equal amount of a (17 percent) linseed oil modified phenolic-aldehyde resin of conventional type was utilized as a substitute for the thiazole resin in Example A-1. Linseed oil was included in this instance in order to plasticize and soften the phenolic resin and thereby modify its extreme brittleness at high temperatures. This is a known practice in the production of friction elements using compositions of the kind set forth in Examples A-1, B-1, and C-1. The mixture including the oil-modified phenolic was press-cured for one hour at 300° F., which is the usual practice, and the product was then oven-cured in the following conventional manner:

2 hours at 310° F.
2 hours at 340° F.
3 hours at 373° F.

Table II lists a comparison of Examples A-1, B-1, and C-1.

Table II

| Characteristic | Example | | |
| --- | --- | --- | --- |
| | A-1 | B-1 | C-1 |
| 1. Transverse strength after specified cure (Lbs. at 77° F.). | 10,250 | 15,300 | 14,750. |
| Appearance | Normal | Normal | Normal. |
| 2. Transverse strength after heating "1" for 1 hour at 800° F. (Lbs. at 77° F.). | 12,200 | 5,600 | 1,240. |
| Appearance | Normal | White Chalky. | White Chalky. |
| 3. Transverse strength after heating "1" 1 hour at 800° F. (Lbs. at about 650° F.). | 8,500 | 4,220 | 1,115. |
| Appearance | Normal | White Chalky. | White Chalky. |

The data tabulated in Table II clearly show that the composition containing the thiazole resin, Example A-1 is actually improved by heating at 800° F. for one hour whereas the products bonded with conventional phenolic resins, Examples B-1 (unmodified by a plasticizer) and C-1 (modified by a plasticizer to improve the bond) have lost a substantial amount of strength due to burn-out and thermal decomposition of the bond.

Based on the foregoing examples, equivalents may easily be calculated and resorted to on the basis of choice and experience if desired so long as there is used a mixture of different monomers in the form of methyl substituted aryl amino compounds having available at a position adjacent the amino nitrogen a point of attachment for one of the sulfur valence bonds so that when the monomers are condensed with sulfur thiazole groups are established between the monomers linking the monomers together as a heat resistant resin of the kind described. This point of attachment is afforded by an unsubstituted position on the ring nucleus adjacent the amino nitrogen.

As was explained above in connection with the balanced formula of condensation with sulfur, there is, of course, but one atom of sulfur contained in the essential thiazole group. The role of the remaining sulfur atoms, namely, the other three per mole of monomer, is simply to remove hydrogen from the amino group and the methyl group and to remove the hydrogen on the ring nucleus adjacent the amino group, all in the form of hydrogen sulfide. In the final analysis then, it is of course important that enough sulfur be used per mole of monomer so as to account for one atom of sulfur present in the thiazole group and additionally enough for dehydrogenation necessary to complete the thiazole group. Accordingly, it will be realized that it is the completion and prevalence of the thiazole groups joining the ring nuclei in the polymer which accounts for the heat resistance.

In Example 6 above it was mentioned that a system using about 3.2 moles of sulfur per mole of monomer did not result in resins having satisfactory characteristics in accordance with the present invention. In this connection, it is important to bear in mind that the foregoing examples involve closed systems, that is, batch operations, and in circumstances such as this it is important that about four formula weights of sulfur be used per mole of monomer, and incidentally this also results in the most rapid production of the resin since theoretically there is instantaneously available the entire sulfur requirement for formation of the thiazole groups and elimination of the hydrogen atoms mentioned above. Example 9 above shows, however, that the sulfur requirements can be added in progressive increments, and while this does slow down the process to this extent, Example 9 demonstrates that the manner in which sulfur is introduced into the system is not important so long as sulfur is introduced into the thiazole ring and completion of the thiazole ring is accomplished by removing the hydrogen atoms mentioned above. Therefore, it will be recognized that so far as the thiazole ring itself is concerned, the sulfur in excess of one atom per monomer is simply used to remove those hydrogens that are necessary to closure of the thiazole ring manifest in the joining of the methyl carbon to the amino nitrogen between adjacent monomers, and this aspect of the present invention can be best understood and appreciated by reference to the following type formula characterizing the structure of the resin of the present invention:

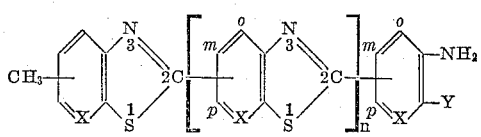

In the above formula, n indicating the number of intermediate monomers between the terminal monomers must be at least 1; X is selected from

and =N—; o, m and p respectively identify ortho, meta and para positions on the ring nuclei; and Y is either —H or —SH. For superior heat resistance, n should be at least 2 which is to say that the most superior heat resistant thiazole polymers of the present invention include at least four monomers in the chain. The Y group on the terminal monomer in the above formula may be either an unsubstituted hydrogen on the ring carbon adjacent the $NH_2$ group, or this hydrogen may possibly be replaced by an —SH group. We are not certain as to this, but it is unimportant because the essential feature is that the thiazole groups be formed by way of condensation with sulfur and that mixed monomers be used. Thus, each of the No. 2 thiazole carbon atoms in the thiazole groups is attached to the adjacent ring nucleus in an ortho or a meta or a para position, but in the resin end product such thiazole carbon attachments will be in not more than about ninety percent of any one of the ortho, meta or para positions, which is another way of saying that the mixed monomers used in the condensation reaction with sulfur should be present in at least about a ten percent molar concentration, since as explained above, resort to commercially pure monomers does not produce a thiazole resin having the needed resinous properties in accordance with the present invention. Thus, in the final end product, the thiazole carbon attachments identified above as a totality are mixed among at least selected two of the ortho, meta and para positions, such that in a binary system among ortho and meta and para positions, at least about ten percent of the mentioned thiazole carbon attachments are either ortho, meta or para, and the remainder of ninety percent of the thiazole carbon attachments are in the other position. To be on the safe side, the distribution should be at least twenty-five percent in a binary mixture and of course a tertiary system can be viewed as a variation of a binary system, that is, again the thiazole carbon attachments as a total are mixed among the available isomeric positions but any one does not exceed about ninety percent with the remaining attachments at other of the isomeric positions.

Hence, while we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of preparing a resin comprising: preparing a mixture of about four formula weights of sulfur and about one formula weight of a mixture of at least two different methyl-substituted amine monomers selected from the group consisting of ortho, meta and para toluidine isomers, 4-methyl, 5-methyl and 6-methyl 2-aminopyridine isomers; at least one amine of said mixture of amine monomers being present in an amount of at least about ten percent; subjecting said mixture of sulfur and different monomers to a condensation reaction at a temperature range of about 200–260° C. releasing hydrogen sulfide as a condensation by-product until there is formed a heavy viscous resinous condensation reaction end product; and separating said end product and cooling the same to a solid-state friable resin.

2. A method according to claim 1 in which the mixture of different methyl-substituted cyclic amines is a mixture selected from the named toluidines.

3. A method according to claim 2 in which the resin is branched by introduction of a difunctional xylidine reactant.

4. A method of preparing a resin comprising: preparing a mixture of sulfur and at least two different methyl-substituted amine monomers selected from the group consisting or ortho, meta and para toluidine isomers, 4-methyl, 5-methyl and 6-methyl 2-aminopyridine isomers; at least one amine of said mixture of amine monomers being present in an amount of about ten to ninety percent of the entire mixture of different methyl-substituted amine monomers; and maintaining said mixture of sulfur and different monomers at a condensing temperature for the mixture releasing hydrogen sulfide as a condensation by-product until there is formed a heavy viscous resinous condensation reaction end product adapted to be cooled to a solid-state friable resin; the amount of sulfur used being sufficient to convert substantially all of the methyl groups on the different methyl-substituted amine monomers to thiazole groups.

5. A resin having the formula

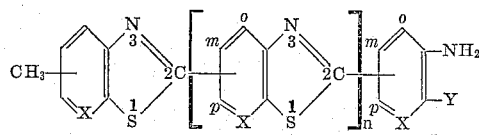

and wherein:
$n$ is at least 2
X is selected from $$-\overset{H}{C}=$$

and $=N-$ $o$, $m$ and $p$ respectively identify ortho, meta and para positions on the ring nuclei Y is selected from —H and —SH and wherein each of the No. 2 thiazole carbon atoms in the thiazole groups linking the thiazole groups to the ring nuclei is attached to the adjacent ring nucleus at one of the identified ortho, meta and para positions; and wherein not more than about ninety percent of the thiazole carbon attachments are in any one of the ortho, meta and para positions thereby characterizing the series of said attachments within the resin chain as inclusive of at least two different of the identified ortho, meta and para positions.

6. The resin according to claim 4.

References Cited in the file of this patent
UNITED STATES PATENTS 1,654,856     Blumfeldt et al.     Jan. 3, 1928

UNITED STATES PATENT OFFICE
CERTIFICATE OF CORRECTION

Patent No. 3,047,543                                     July 31, 1962

Avery A. Morton et al.

It is hereby certified that error appears in the above numbered patent requiring correction and that the said Letters Patent should read as corrected below.

Column 5, line 43, for "tolidines" read -- toluidines --.

Signed and sealed this 19th day of March 1963.

(SEAL)
Attest:

ESTON G. JOHNSON
Attesting Officer

DAVID L. LADD
Commissioner of Patents